(12) United States Patent
Andersen

(10) Patent No.: US 8,356,708 B2
(45) Date of Patent: Jan. 22, 2013

(54) MODULAR BELT LINK WITH AN EC EDGE

(75) Inventor: Kenneth Westergaard Andersen, Vilstrup (DK)

(73) Assignee: Ammeraal Beltech Modular A/S (DK)

( * ) Notice: Subject to any disclaimer, the term of this patent is extended or adjusted under 35 U.S.C. 154(b) by 250 days.

(21) Appl. No.: 12/542,896

(22) Filed: Aug. 18, 2009

(65) Prior Publication Data
US 2010/0038216 A1 Feb. 18, 2010

(30) Foreign Application Priority Data
Aug. 18, 2008 (DK) .................................. 2008 01111

(51) Int. Cl.
B65G 17/06 (2006.01)
(52) U.S. Cl. ........................................ 198/853; 198/321
(58) Field of Classification Search ............... 198/502.1, 198/844.1–853, 321
See application file for complete search history.

(56) References Cited

U.S. PATENT DOCUMENTS

| | | | |
|---|---|---|---|
| 3,807,548 | A | 4/1974 | Bergeron |
| 4,105,111 | A | 8/1978 | Lapeyre |
| 4,832,183 | A | 5/1989 | Lapeyre |
| 5,307,923 | A | 5/1994 | Damkjaer |
| 5,339,938 | A | 8/1994 | Patin |
| 5,964,339 | A * | 10/1999 | Matsuura et al. ........ 198/810.03 |
| 6,006,898 | A | 12/1999 | Odink |
| 6,761,264 | B2 | 7/2004 | Steeber et al. |
| 7,360,643 | B1 | 4/2008 | Fandella |
| 7,367,448 | B2 | 5/2008 | Fandella |
| 7,954,632 | B2 * | 6/2011 | Kropf-Eilers ................. 198/847 |
| 7,987,973 | B2 | 8/2011 | Broe |

FOREIGN PATENT DOCUMENTS

| | | |
|---|---|---|
| EP | 0974537 | 1/2000 |
| FR | 2716180 | 8/1995 |

OTHER PUBLICATIONS

Search Report issued by the Danish Patent Office on Jan. 26, 2009 for priority Danish Application No. PA 2008 01111.
Official Action for U.S. Appl. No. 12/542,917, mailed Nov. 1, 2010.

* cited by examiner

Primary Examiner — Gene Crawford
Assistant Examiner — William R Harp
(74) Attorney, Agent, or Firm — Sheridan Ross P.C.

(57) ABSTRACT

Modular belt link of the type having a leading and trailing edge and a top surface there between, and two side surfaces at right angles to the leading and trailing edges, and a lower carrying surface and furthermore provided with a plurality of eye parts for hingedly connecting to adjacent modular belt links, characterised in that the modular belt link is made from a polymer material, and that at least in a side surface a conductive material insert is embedded, such that the conductive material is exposed on the top surface and the side surface, and is part of said top and side surface.

7 Claims, 2 Drawing Sheets

MODULAR BELT LINK WITH AN EC EDGE

CROSS REFERENCE TO RELATED APPLICATIONS

The present application claims the benefit of Denmark Application No. PA200801111 filed Aug.18, 2008, the entire contents of which is incorporated herein by this reference.

FIELD OF THE INVENTION

The present invention relates to a modular belt link.

BACKGROUND OF THE INVENTION

In the art, it is well-known to create conveyor belts by assembling a plurality of substantially identical modular belt links into an endless conveyor structure.

One application for such conveyor belts is conveyor belts used for conveying goods or people. For these purposes, it is necessary to provide means such that any static electricity which arises due to the interaction of other goods or people being transported with relation to the surroundings is discharged without discomfort to the people and possible damage to goods being transported.

An example of such an electric conductive modular belt is known from U.S. Pat. No. 7,360,643 in which a plurality of modules are provided with a plurality of cavities in which cavities inserts made from an electric conductive material are inserted in such a way that points across the surface of the modular belt made up from modules comprising electric conductive inserts, the static electricity will be able to be discharged by conducting the electricity from the surface of the belt by means of the electric conductive inserts to a discharge structure arranged underneath the belt.

This arrangement requires that a good connection is assured between the underside of the belt or at least the underside of the electric conductive inserts and the underlying structure in order to assure an electrical contact such that a good electrical contact and thereby safe discharge of the current may be assured. This intimate contact with the underlying structure causes a relatively high degree of friction and heat development between the belt and the carrying structure, especially when loaded, which is detrimental to the overall performance of the endless conveyor structure.

OBJECT OF THE INVENTION

It is therefore an object of the present invention to provide a modular belt link having electric conductive properties, but where the disadvantages of the prior art are alleviated.

DESCRIPTION OF THE INVENTION

The present invention addresses this by providing a modular belt link which is characterised in that the modular belt link is made from a polymer material, and where at least in a side surface a conductive material insert is embedded, such that the conductive material is exposed on the top surface and the side surface, and is part of said top and side surface.

By solely having the conductive material insert in the side surface, it becomes possible to provide electrical discharge means for discharging any current through the side surface. This in turn does not create or necessitate friction with the underlying structure, but solely requires a good electrical contact to an electrically conductive member arranged adjacent to the side of the modular belt link.

The electrical discharge means may e.g. be a wheel made from an electrical conductive material which is in biased engagement with the side surface, such that only a minimal friction and resistance is created between the engagement member and the endless conveying belt.

In a further advantageous embodiment of the invention at least one conductive material insert is embedded in each side surface.

Depending on the size of the modular belt links and in particular their extend in the longitudinal direction, it may in some embodiments be advantageous to provide more than one insert in that the safety aspects, i.e. that a person will at least at anytime be in contact with a least one insert exposed at the top surface the larger the closure these inserts are arranged.

In a still further advantageous embodiment the conductive material insert is also exposed on the lower carrying surface. With this embodiment, it is foreseen that adjacent the edges of the conveyor belt, a discharge means may be arranged e.g. as explained above without creating unnecessary friction with excessive wear and heat as a consequence.

In a still further advantageous embodiment, the conductive material is a polymer material where the Shore hardness of said material is equal to or higher than that of the polymer material from which the belt link is made. In this manner, it is ensured that the bulk of the modular belt link will wear faster than the conductive insert, thus it is relatively safe that at all times the electric contact between the modular belt link member and the discharge member and the discharge member arranged in the conveying structure will be kept intact even if excessive wear occurs on the belt links as such.

In a still further advantageous embodiment the polymer material is suitable wherein the polymer materials are suitable to be injection moulded, where the two different materials are injection moulded in one injection cycle. It is well-known in the art to use two component injection moulding machines such that both the base material from which the modular belt link is moulded as well the conductive material from which the insert are moulded may be moulded together in a singular injection moulding process.

In a still further advantageous embodiment the conductive material insert is fully integrated in the modular belt link. And furthermore in a still further advantageous embodiment a conductive material insert is provided wherein a conductive material insert is provided at least in one side surface, and a string of conductive material is arranged spanning the top surface from side edge to side edge, connecting with said conductive material insert. In this manner by providing a string, i.e. a very narrow and shallow conductive insert across the entire surface from one side of the modular belt link to the upper side of modular belt link connecting inserts either provided in both sides or at least one side, the probability of a person travelling on the conveyor surface being in contact with the conductive member and thereby electrical discharge is greatly improved.

The invention is also directed to a conveyor structure comprising an endless conveyor belt made from modular belt links according to any of claims 1 to 7, where means are provided in the structure for positively engaging a side surface of the conveyor belt, made from a plurality of modular belt links, where said means for engaging the side surface of the modular belt links is electrically conductive and connected to electrical discharge means.

DESCRIPTION OF THE DRAWING

The invention will now be explained with reference to the accompanying drawing, wherein.

DETAILED DESCRIPTION OF AN EMBODIMENT OF THE INVENTION

Figure 1:
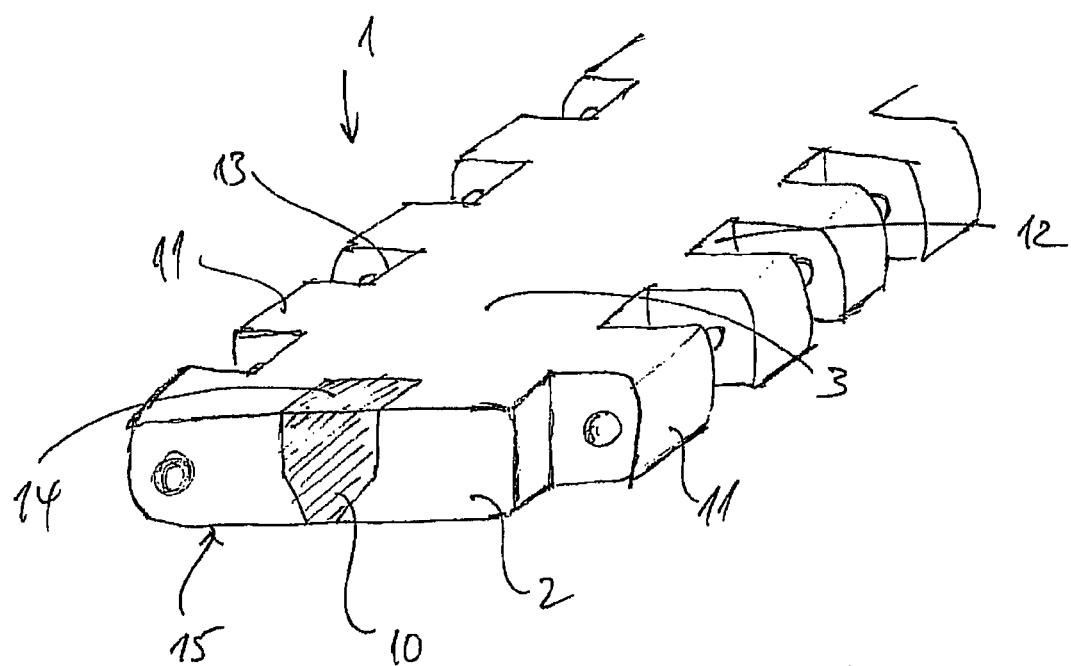
FIG. 1 illustrates a schematic perspective of an end of a modular belt link according to the invention.

In FIG. 1 is schematically illustrated an end of a modular belt link according to the invention where a conductive material insert 10 is illustrated embedded in a side surface 2 of the modular belt link 1.

For illustrative purposes eye parts 11 are illustrated along the leading and trailing edges 12, 13, but for the invention to fulfill its purpose the connection between adjacent modular belt links is outside the scope of this invention and irrelevant for the proper functioning of the present invention.

The insert 10 is embedded in a side surface such that the insert 10 has an exposed section 14 on the belt links top surface 3. This is important in that the goods and personnel being transported on belt links of this type must be able to easily create contact with the conductive insert 10 in order to discharge any static electricity generated.

Figure 2:
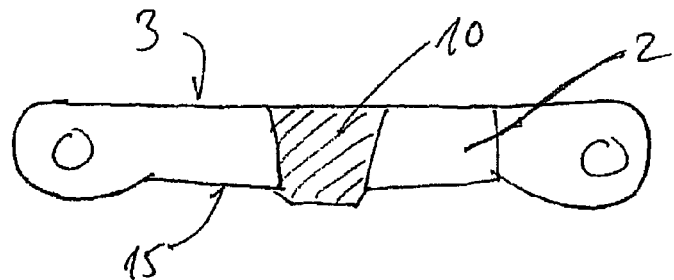
FIGS. 2 and 3 illustrate alternative embodiments of electrically conductive inserts exposed in the side surfaces of modular belt links
Figure 3:
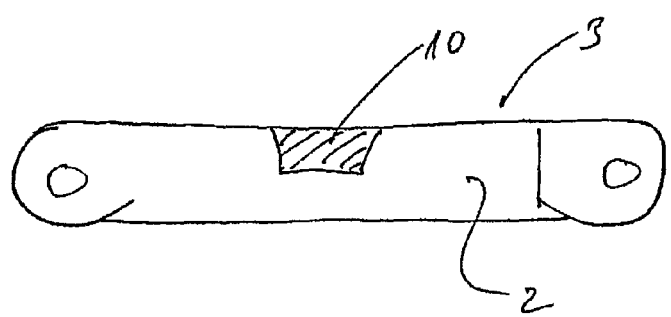

In the illustrated embodiment, the insert 10 traverses the entire material thickness of the modular belt link 1 such that the insert is also exposed on the underside 15 of the belt link. With reference to FIGS. 2 and 3, various embodiments will be explained regarding this aspect.

The material from which the conductive insert is made may be selected according to the manufacturing process for various polymer materials having electric conductive properties which are well-known in the art. Typically, the electrical resistance for a material suitable for dissipation, i.e. discharge of static electricity is $10^{2-}$-$10^5$ Ohm ($\Omega$).

The conductivity of the polymer materials is achieved by introducing into the polymer material compounds such as carbon black fibres or carbon powders or in some instances steel fibres. Also polymer materials such as polyacetal or electric conductive polypropylene may be used. As the insert has a very limited volume with respect to the volume of the entire modular belt link, the extra cost of these types of material is minimal such that modular belt links manufactured according to the invention need only be slightly more expensive from a material point of view than standard belt links.

In FIG. 2 is illustrated a side surface 2 of a belt link as schematically illustrated with reference to FIG. 1. From this view, it is clear that the insert 10 traverses the entire side surface 2 such that it is exposed on the top surface 3 and the bottom surface 15. In this manner, it is possible to provide conductive means in the chassis construction carrying the modular belt link for discharging the static electricity generated on the conveyor belt and dissipated through the insert 10.

Turning to FIG. 3 an alternative embodiment is illustrated where the insert 10' only projects partly down the side surface 2. In this embodiment, it is necessary to provide conductive connecting means which will be able to connect to the insert in the side surface 2. Such connecting means are illustrated with reference to FIG. 4.

Figure 4:
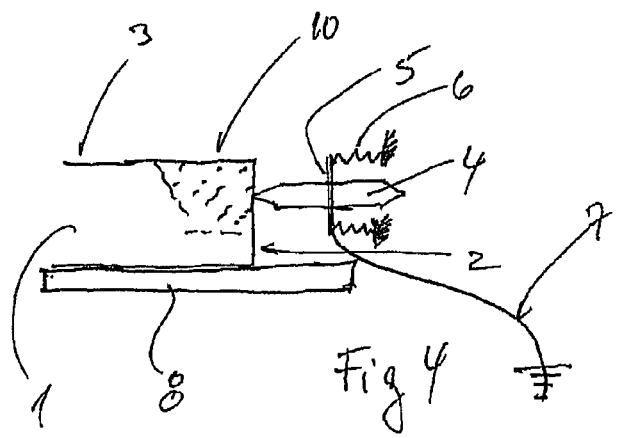
FIG. 4 illustrates an arrangement for dissipating static electricity from a conveyor belt to ground.

In FIG. 4, the construction is schematically illustrated in which the static electricity generated on the conveyor belt may be dissipated through the electrical insert 10 provided in a side surface 2 of the modular belt link 1. As is clearly visible in FIG. 4, the electrically conductive insert 10 is both exposed on the top surface 3 and a side surface 2. By arranging a wheel 4 rotatable about an axis 5 and optionally biased by e.g. helical spring means 6, the wheel 4 is forced into contact with the side surface 2 of the conveyor belt and thereby the electrically conductive insert 10 in such a way that the static electricity may be dissipated through the electrically conductive insert 10, the wheel 4 and a ground connection illustrated with 7. In this manner, the chassis illustrated by the carrying wheel need not have special conductive characteristics.

Figure 5:
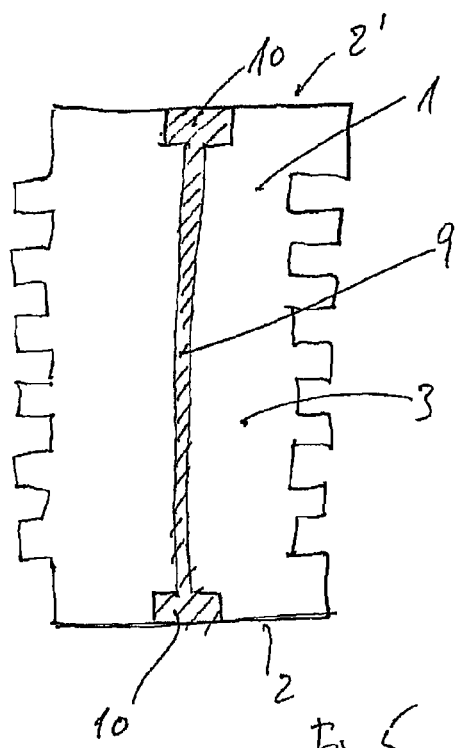
FIG. 5 illustrates a modular belt link comprising an electrically conductive string.

In an alternative embodiment illustrated in FIG. 5 a further embodiment of the invention illustrated where the modular belt link 1 is provided with electrically conductive inserts 10 in both side surfaces 2, 2'. It should be noted in this context that in order to dissipate the electricity, the modular belt link 1 needs only to have one electrically conductive insert 10 along one of the side surface 2.

Between the two inserts 10 a conductive string 9 is embedded in the top surface 3 of the modular belt link 1. The string 9 may be flush with or slightly elevated relative to the top surface such that personnel travelling on the assembly conveyor belt will receive a positive indication when stepping on the conductive string 9.

The electrically conductive insert 10 may advantageously be made from a material having a shore hardness which is higher than the material from which the modular belt link is made such that wear and tear in the belt link does not affect the electrically conductive insert 10 in the same manner whereby it is assured that during the entire service life of the modular belt link 1, the electrically conductive properties are provided.

The invention claimed is:

1. A modular belt link comprising:
 a body having a leading and trailing edge, a top surface disposed there between, two side surfaces located at right angles to the leading and trailing edges, and a lower carrying surface;
 a plurality of eye parts for hingedly connecting adjacent modular belt links, wherein the modular belt link is made from a polymer material; and
 a conductive material insert embedded in at least one of the side surfaces, such that the conductive material insert is exposed on the top surface and one of the side surfaces, and is part of said top and the one side surface; and
 wherein a smaller string of conductive material is arranged to continuously span the top surface from one side surface to the other side surface, and connecting with said conductive material insert.

2. The modular belt link according to claim 1, wherein at least one conductive material insert is embedded in each side surface.

3. The modular belt link according to claim 1, wherein the conductive material insert is also exposed on the lower carrying surface.

4. The modular belt link according to claim 1, wherein the conductive material is a polymer material, where the shore hardness of said material is equal to or higher than that of the polymer material from which the belt link is made.

5. The modular belt link according to claim 4, wherein the polymer materials are suitable to be injection moulded, where the two different materials are injection moulded in one injection cycle.

6. The modular belt link according to claim 1, wherein the conductive material insert is shaped to conform with the modular belt link.

7. A conveyor structure comprising:

an endless conveyor belt including a plurality modular belt links, at least one of said belt links including:

a body having a leading and trailing edge, a top surface disposed there between, two side surfaces located at right angles to the leading and trailing edges, and a lower carrying surface;

a plurality of eye parts for hingedly connecting adjacent modular belt links, wherein the modular belt link is made from a polymer material, and a pair of conductive material inserts embedded in respective side surfaces, such that the conductive material inserts are exposed on the top surface and the respective side surfaces, and the inserts are shaped to conform with said top surface and said respective side surfaces;

an engaging element for engaging at least one side surface of the conveyor belt, said engaging element being electrically conductive; and a ground connection connected to the engaging element for discharging static electricity.

\* \* \* \* \*